US007253837B2

(12) United States Patent
Henderson et al.

(10) Patent No.: US 7,253,837 B2
(45) Date of Patent: Aug. 7, 2007

(54) ACTIVE-PIXEL IMAGE SENSORS

(75) Inventors: Robert Henderson, Edinburgh (GB); Jonathan Ephriam David Hurwitz, Edinburgh (GB)

(73) Assignee: STMicroelectronics Ltd., Buckinghamshire (GB)

( * ) Notice: Subject to any disclaimer, the term of this patent is extended or adjusted under 35 U.S.C. 154(b) by 622 days.

(21) Appl. No.: 10/407,871

(22) Filed: Apr. 4, 2003

(65) Prior Publication Data

US 2004/0027470 A1 Feb. 12, 2004

(30) Foreign Application Priority Data

Apr. 5, 2002 (EP) .................................. 02252472

(51) Int. Cl.
*H04N 5/217* (2006.01)
*H04N 5/21* (2006.01)
*H04N 3/14* (2006.01)
*H01L 27/00* (2006.01)

(52) U.S. Cl. ...................... 348/241; 348/302; 348/308; 250/208.1

(58) Field of Classification Search ................ 348/241, 348/243, 300, 216.1; 250/208.1
See application file for complete search history.

(56) References Cited

U.S. PATENT DOCUMENTS 5,841,126 A * 11/1998 Fossum et al. .......... 250/208.1
6,115,066 A 9/2000 Gowda et al. .............. 348/308

FOREIGN PATENT DOCUMENTS

FR 2795586 12/2000

OTHER PUBLICATIONS

Mendis et al., CMOS Active Pixel Image Sensors for Highly Integrated Imaging Systems. IEEE Journal of Solid-State Circuits, vol. 32, Feb. 1997, pp. 187-197.*

* cited by examiner

*Primary Examiner*—David Ometz
*Assistant Examiner*—Wanda M. Negrón
(74) *Attorney, Agent, or Firm*—Lisa K. Jorgenson; Allen, Dyer, Doppelt, Milbrath & Gilchrist, P.A.

(57) ABSTRACT

An image sensor has an array of pixels read by column circuits to provide reset and read samples on a pair of sample capacitors. To alleviate the effects of parasitic capacitance in the region of the sample capacitors, a modified timing arrangement is used. Both sample switches are operated simultaneously to pre-charge both sample capacitors with a pixel signal value. One sample switch is operated after reset to apply a reset value to one of the pre-charged sample capacitors.

17 Claims, 1 Drawing Sheet

ACTIVE-PIXEL IMAGE SENSORS

FIELD OF THE INVENTION

The present invention relates to active-pixel image sensors, and more particularly to CMOS image sensors.

BACKGROUND OF THE INVENTION

As is well known, active-pixel image sensors have the advantage that they can be made as single chips by conventional CMOS technology, in contrast to CCD image sensors which require special fabrication facilities and are typically implemented as multiple chips due to the range of power supplies required. However, the quality of images produced by active pixel CMOS sensors is poorer than that of CCD devices. One reason for this is the presence of fixed pattern noise (FPN), which includes pixel-to-pixel FPN and vertical FPN. FPN is particularly present when double sampling (sometimes referred to as correlated double sampling) is used to reduce other sources of noise.

SUMMARY OF THE INVENTION

One object of the present invention is to reduce FPN in active pixel double sampling image sensors.

An image sensor has an array of pixels read by column circuits to provide reset and read samples on a pair of sample capacitors. To alleviate the effects of parasitic capacitance in the region of the sample capacitors, a modified timing arrangement is used. Both sample switches are operated simultaneously to pre-charge both sample capacitors with a pixel signal value. One sample switch is operated after reset to apply a reset value to one of the pre-charged sample capacitors.

Preferred features and advantages of the invention will be apparent from the claims and the following description.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

Figure 1:
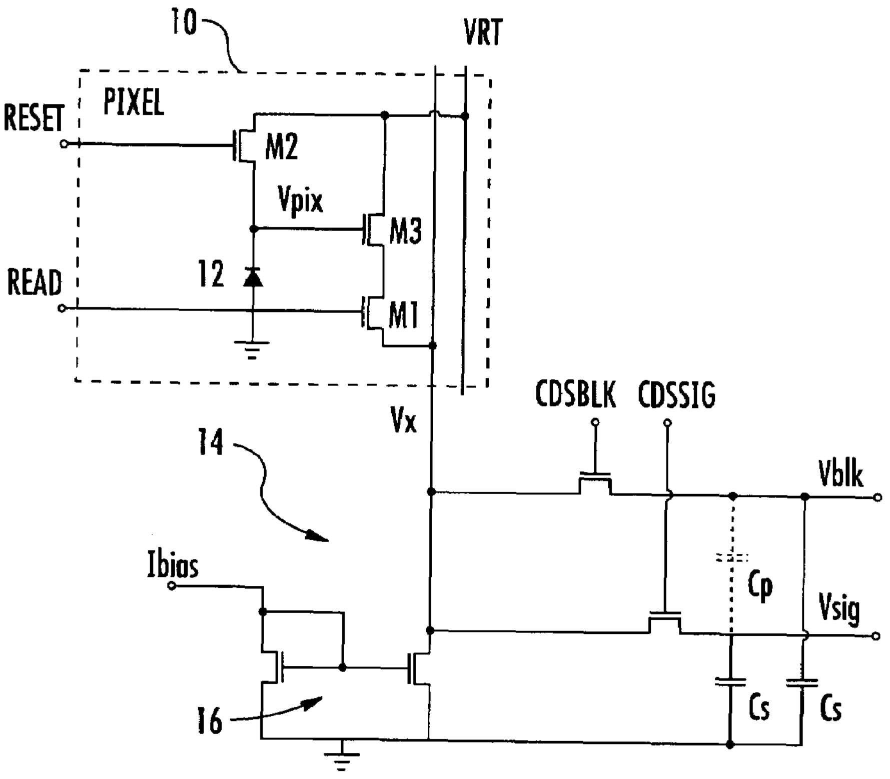
FIG. 1 is a schematic diagram illustrating part of an image sensor.

FIG. 1 shows one pixel 10 of a known three transistor pixel array. Each pixel comprises a photosensitive divide 12 and transistors M1, M2, M3. A reset voltage is supplied on line VRT, in this embodiment per column but horizontal VRT lines may also be used. Each column has an output circuit 14 connected to the column by line Vx and including double sampling capacitors Cs. A current source draws a current Ibias through the pixel source follower buffer amplifier 16.

Figure 2:
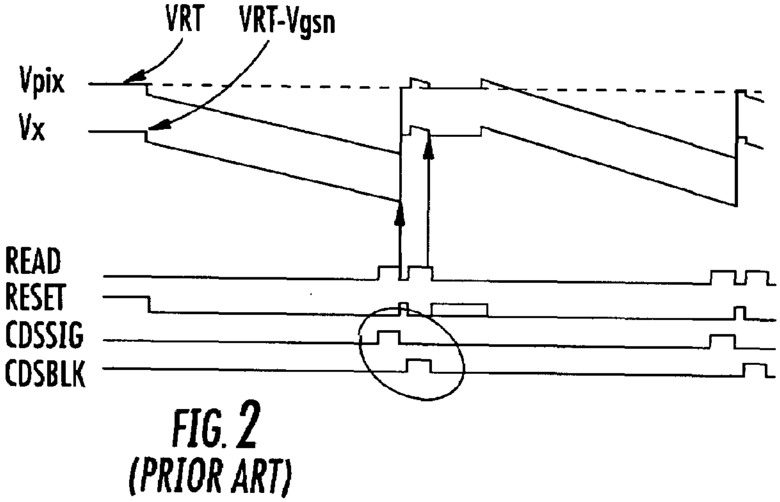
FIG. 2 is a timing diagram illustrating a prior art operation of the circuit of FIG. 1.

FIG. 2 shows the timing required to operate this circuit in a typical rolling shutter exposure mode. The pixel 10 voltage Vpix is periodically reset to the reference voltage VRT by pulsing reset high. When the pixel 10 is released from reset, it begins to integrate photogenerated current on the capacitance of the photodiode 12. The light signal is detected after a certain exposure time. The read signal goes high and the signal CDSSIG pulses, thus sampling the source follower output (Vpix−Vgsn) as Vsig, where Vgsn is the gate-source reset noise of transistor M3. The pixel 10 is reset by pulsing reset again and a second sample is taken by pulsing CDSBLK. The voltage (VRT−Vgsn) is sampled as Vblk. The differential signal Vdiff=(Vblk−Vsig)=(VRT−Vpix) is then processed by the remainder of the readout circuitry (not shown).

Vdiff removes the process variation of Vgsn between pixels which arises because of variation of Vtn in transistor M3. To maximize the photosensitive area of the sensor, the transistors used in the pixel are near to the minimum size allowed by the fabrication process. The Vtn variation is known to be inversely proportional to the square root of gate area. Standard deviations of tens of millivolts are typical. The layout of the column circuit elements is conventionally accomplished within a pitch matched to the pixel dimensions, typically about 5 μm in current semiconductor processes. The density of such a layout means that some parasitic capacitance between the top plates of the sampling capacities Cs is unavoidable. This parasitic capacitance is indicated as Cp in FIG. 1. The effect of the parasitic capacitance Cp on the sampled voltages is now analyzed.

Assume that, at some time before the CDSSIG and CDSBLK pulses occur, Vsig and Vblk are pre-charged to a voltage Vprch. CDSSIG pulses, bringing Vsig to (Vpix−Vgsn). The voltage step applied to the capacitance Cp is (Vpix−Vgsn−Vprch) which causes the top plate of Vblk to change to voltage:

$$Vblk=Vprch+Cp/Cs(Vpix-Vgsn-Vprch)$$

During the CDSBLK phase, the Vblk voltage changes to (VRT−Vgsn). The voltage step on capacitance Cp is (VRT−Vgsn−Vprch−Cp/Cs(Vpix−Vgsn−Vprch)). This is transmitted to Vsig, which is no longer driven by the pixel. Neglecting terms in $Cp^2/Cs^2$, the resulting voltage on Vsig is $$Vsig=(Vpix-Vgsn-Vprch)+Cp/Cs(VRT-Vgsn-Vprch)$$

The difference voltage Vdiff is then $$\begin{aligned} Vdiff &= (Vblk - Vsig) \\ &= VRT - Vpix - Cp/Cs(VRT - Vgsn - Vprch) \end{aligned}$$

The error term Cp/Cs Vgsn has a process-dependent distribution of up to several millivolts depending on layout and Vt spread. This contributes a pixel-to-pixel FPN which can be important. Also, if Vprch varies between columns then a vertical FPN may result from the term Cp/CsVprch.

Figure 3:
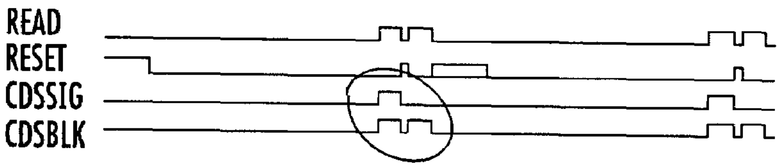
FIG. 3 is a similar diagram illustrating the operation of the circuit of FIG. 1 in accordance with one embodiment of the invention.

The present invention alleviates this problem by altering the timing, as illustrated in one embodiment shown in FIG. 3. CDSSIG and CDSBLK are pulsed together, which pre-charges both capacitors Cs to (Vpix−Vgsn). During the second cycle, CDSBLK pulses charging Vblk to (VRT−Vgsn). The voltage step across Cp is now $$(VRT-Vgsn)-(Vpix-Vgsn)=VRT-Vpix$$

The error is transmitted to Vsig as $$Vsig=Vpix-Vgsn+Cp/Cs(VRT-Vpix)$$

The voltage difference processed by the readout is $$Vdiff=(Cs+Cp)/Cs(VRT-Vpix)$$

This represents a small gain error for the whole image, rather than an FPN source.

Similar timing can be applied to any active pixel array using double sampling or double read with storage or sampling capacitors. For example, in an image sensor using four transistors, pinned photodiode pixels, each transistor including a transfer gate, the same result can be achieved by:

(a) applying a pixel reset value to both capacitors;

(b) applying a transfer gate voltage to the pixel to obtain a pixel readout voltage; and (c) applying the pixel readout voltage to one of the capacitors.

The readout circuit is unchanged from the above embodiment, only the sequence of signal then reset is reversed. This is equivalent to exchanging CDSSIG and CDSBLK in the timing diagram of FIG. 3. The timing of the pixel reset signal would occur just before the first pulse of CDSSIG/CDSBLK and a transfer gate pulse would occur between the first and second CDSSIG pulses.

Thus, the invention alleviates fixed pattern noise caused by variances in circuit elements arising from available fabrication processes. Simulations suggest that the alleviation attainable would allow production of CMOS active pixel sensors giving the picture quality comparable to CCD devices.

That which is claimed is:

1. A method of operating an image sensor comprising an array of active pixel elements, each column of pixels having an output circuit including a pair of sample capacitors and associated switches for applying pixel voltages to the sample capacitors, the method comprising:

operating the switches to apply a readout value to both sample capacitors;

applying a reset voltage for changing a state of the pixel;

operating the switches to apply a reset value to one of the capacitors; and utilizing a difference of resulting voltages on the capacitors as the image value for the pixel.

2. The method of claim 1, wherein each pixel comprises a three-transistor pixel.

3. The method of claim 1, wherein each pixel comprises a pinned-photodiode pixel.

4. The method of claim 1, wherein operating the switches to apply the readout value to both sample capacitors is performed at the end of a time interval from release of the pixel from a preceding reset, the time interval being selected to define a desired exposure period.

5. A method of operating an image sensor comprising an array of active pixels and output circuits each including a pair of sample capacitors, the method comprising:

applying a readout value to both sample capacitors;

applying a reset voltage for changing a state of the pixel;

applying a reset value to one of the capacitors; and generating an image value for the pixel by differencing resulting voltages on the sample capacitors.

6. The method of claim 5, wherein each pixel comprises a three-transistor pixel.

7. The method of claim 5, wherein each pixel comprises a pinned-photodiode pixel.

8. The method of claim 5, wherein applying the readout value to both sample capacitors is performed at the end of a time interval from release of the pixel from a preceding reset, the time interval being selected to define a desired exposure period.

9. An image sensor comprising:

an array of active three transistor pixels, each column of three transistor pixels including a column output line and an output circuit comprising a pair of sample capacitors and a respective pair of switches connecting the sample capacitors to the column output line; and timing means for operating the switches to apply a readout value to both sample capacitors, to apply a reset voltage which changes the state of the three transistor pixel, and to operate one of the switches to apply a reset value to one of the sample capacitors.

10. The image sensor according to claim 9, wherein the image sensor is a solid state CMOS image sensor.

11. An image sensor comprising:

an array of active three transistor pixels, each column of three transistor pixels including a column output line and an output circuit comprising a pair of sample capacitors selectively connected to the column output line; and a timing circuit to apply a readout value to both sample capacitors, to apply a reset voltage which changes the state of the three transistor pixel, and to apply a reset value to one of the sample capacitors.

12. The image sensor according to claim 11, wherein the image sensor is a solid state CMOS image sensor.

13. A method of operating an image sensor comprising an array of pixels and output circuits each including a pair of sample capacitors, the method comprising:

applying a reset value to both sample capacitors;

changing a state of the pixel by at least applying a transfer gate voltage to the pixel;

applying a readout value to one of the capacitors, and generating an image value for the pixel by differencing resulting voltages on the sample capacitors.

14. The method of claim 13, wherein each pixel comprises a three-transistor pixel.

15. The method of claim 13, wherein each pixel comprises a pinned-photodiode pixel.

16. An image sensor comprising:

an array of four transistor pinned photodiode pixels having a transfer gate, each column of four transistor pinned photodiode pixels including a column output line and an output circuit comprising a pair of sample capacitors selectively connected to the column output line; and a timing circuit to apply a reset value to both sample capacitors, to apply a transfer voltage to the transfer gate which changes a state of the four transistor pinned photodiode pixel, and to apply a readout value to one of the sample capacitors.

17. The image sensor according to claim 16, wherein the image sensor is a solid state CMOS image sensor.

* * * * *